United States Patent [19]

Riganti

[11] Patent Number: 4,533,785
[45] Date of Patent: Aug. 6, 1985

[54] SPACER-DAMPER FOR A BUNDLED CONDUCTOR FOR AN ELECTRIC LINE

[75] Inventor: Innocente Riganti, Solbiate Arno, Italy

[73] Assignee: Innocente Riganti Officine Meccaniche S.p.A., Solbiate Arno, Italy

[21] Appl. No.: 533,536

[22] Filed: Sep. 19, 1983

[30] Foreign Application Priority Data

Sep. 17, 1982 [IT] Italy .................... 23315 A/82

[51] Int. Cl.$^3$ .................... H02G 7/14; H02G 7/12
[52] U.S. Cl. ........................ 174/42; 174/146
[58] Field of Search ................. 174/42, 146

[56] References Cited

U.S. PATENT DOCUMENTS

| | | | |
|---|---|---|---|
| 3,582,983 | 6/1971 | Claren | 174/42 |
| 3,748,370 | 7/1973 | Dalia | 174/42 |
| 3,784,723 | 1/1974 | Cantamessa | 174/42 |
| 3,958,076 | 5/1976 | Moore et al. | 174/42 |

Primary Examiner—Laramie E. Askin
Attorney, Agent, or Firm—Peter K. Kontler

[57] ABSTRACT

A device is provided for spacing apart and damping bundled conductors in an electric line. The device comprises a support, a plurality of arms each carrying a clamp adapted to clamp about and hold one sub-conductor in the bundle of conductors and at least one flexible joint for each arm provided on said support and adapted to flexibly secure a respective arm to said support. Each joint includes at least one frame integral with and secured to said support and located in a plane relative to the plane of the support, a core positioned within the frame to which a respective arm is attached, and at least two elastic elements provided between the core and the frame for retaining the core elastically within the frame. The frame may be located in the plane of the support or in an inclined plane relative to the plane of the support. Additionally, two or more frames may be provided for each arm, each located in a plane coincident with or parallel to the plane of the support. The elastic elements may be fabricated from elastomeric materials or they may be steel springs.

33 Claims, 6 Drawing Figures

SPACER-DAMPER FOR A BUNDLED CONDUCTOR FOR AN ELECTRIC LINE

BACKGROUND OF THE INVENTION

The present invention relates to a spacer-damper for bundled conductors of electric lines and, more particularly, to such a device which is capable of substantially damping the movements of the individual sub-conductors from aeolian vibrations. In bundled conductors of high and very high tension electric lines, i.e., conductors composed of two or more sub-conductors for each electric phase, it is necessary to keep the correct mutual spacing of the sub-conductors along each span between adjacent towers as well as along the entire length of an electric line. It is further necessary to substantially damp the movements of the individual sub-conductors from aeolian vibrations, i.e., high frequency and small amplitude vibrations caused by weak winds as well as violent and large amplitude oscillations caused by strong winds.

Spacer-dampers are devices which are mounted on the electric lines in order to meet both of the above requirements. Single joint spacer-dampers are disclosed, for example, in U.S. Pat. No. 3,748,370, owned by S.A.S. Officine Meccaniche Innocente Riganti di Innocente e Franco Riganti & C. of Solbiate Arno, Italy. Multiple joint spacer-dampers are presently manufactured by DAMP of Sovere, Italy and A. SALVI & C. of Milan, Italy.

The principal disadvantage of a single joint spacer-damper such as the one described, for example, in U.S. Pat. No. 3,748,370, is that, due to its reliance on a single joint, each arm is permitted to move only in an angular direction. Since angular oscillations are centered in the joint center, there is no possibility of movement in the direction of the arm axis. The main disadvantage of the multiple spacer-dampers of the two other cited manufacturers resides in the fact that, while they are permitted to move in a number of directions, movement is restricted to the plane perpendicular to the longitudinal axis of the sub-conductors. Moreover, in all of these devices, the rigidity of the joint is nearly constant under aeolian vibrations and, as such, the damping effect depends only on the hysteresis of the elastic means comprised in the joints with almost all of the dissipated energy being transformed to heat which damages the elastic means. Furthermore, as in almost all these devices, the elastomeric elastic means becomes compressed. A further disadvantage associated with such devices is that their performance varies widely depending upon the external temperature at the time.

Finally, the prestresses of the elastic means result in the joints being extremely rigid and, consequently, such devices are not sensitive to small exciting forces.

OBJECTS AND SUMMARY OF THE INVENTION

An object of the present invention is to provide a damping device which may be used in association with bundled conductors of high tension and very high tension electric lines.

It is another object of the present invention to provide such a damping device which substantially damps the movement of the individual sub-conductors from aeolian vibrations.

It is yet another object of the present invention to provide such a damping device which is capable of damping high frequency and small amplitude vibrations caused by weak winds and violent and large amplitude oscillations caused by strong winds.

The present invention, in brief summary, comprises a device for spacing apart and damping bundled conductors in an electric line. The device comprises a support, a plurality of arms each carrying a clamp adapted to clamp about and hold one sub-conductor in the bundle of conductors and at least one flexible joint for each arm provided on said support and adapted to flexibly secure a respective arm to said support. Each joint includes at least one frame integral with and secured to said support and located in a plane relative to the plane of the support, a core positioned within the frame to which a respective arm is attached, and at least two elastic elements provided between the core and the frame for retaining the core elastically within the frame. The frame may be located in the plane of the support or in an inclined plane relative to the plane of the support. Additionally, two or more frames may be provided for each arm, each located in a plane coincident with or parallel to the plane of the support. The elastic elements may be fabricated from elastomeric materials or they may be steel springs.

The spacer-damper device, according to the present invention, comprises a support on which a plurality of arms are provided for holding sub-conductors. The arms, which are articulated on the support, are provided in a number equal to the number of sub-conductors in the relevant bundle of conductors. A joint is provided between the support and an arm which includes a clamp for securing the same to the sub-conductors. The joint includes a frame integral with or fixed to the support and positioned in a plane containing the support; a core positioned within the frame; and a plurality of elastic elements each having one end fixed to the frame and the other end fixed to the core for keeping the core itself elastically within the frame. The elastic elements are symmetrically spaced around the periphery of the core. An arm having at one end thereof a clamp for clamping a sub-conductor is fixed at the other end to the core in such a manner that it can move elastically within the frame under any action which the relevant sub-conductor can transmit in any direction to the arm.

In a first alternative embodiment, each joint provided between the support and the arm includes one or more frames integral with or fixed to the support and provided in a plane which is inclined relative to the support; a core positioned within each frame; and a plurality of elastic elements each having one end fixed to the corresponding core for keeping the core itself elastically within the frame. The elastic elements for each frame are symmetrically spaced around the periphery of the core. An arm which has at one end thereof a clamp for clamping a sub-conductor is fixedly mounted to the core at its opposite end, said arm being permitted to move elastically within the corresponding frame under any action which the relevant sub-conductor may transmit in any direction to the arm.

In a second alternative embodiment, each of the joints between the support and an arm comprises: two or more frames integral with or fixed to the support and provided in planes coincident with or parallel to a plane containing the support; a core positioned within each frame; and a plurality of elastic elements for each frame, each of said elements having one end fixed to the corresponding frame and the other end fixed to the corresponding core so as to retain the core elastically within the frame. The elastic elements for each frame are symmetrically spaced around the periphery of the core. An arm which has at one end thereof a clamp for clamping a sub-conductor is fixedly mounted to the core at its opposite end, said arm being permitted to move elastically within the corresponding frame under any action which the relevant sub-conductor may transmit in any direction to the arm.

The elastic elements provided may be elastomeric elements or steel springs, both of them being adapted to be compressed, extended, bent and twisted under actions transmitted from the sub-conductors through the arms. The elastomeric elements are secured to the core and the frame (or to plates fastened to the frame) by adhesive bonding or by mechanical fastening means, such as, for example, by the use of flange extensions at the ends of the elastic elements, conveniently engaged in corresponding recesses in the core and in the frame. Similarly, steel springs are secured to the core and to the frame by known mechanical fastening means or by welding. The principal advantages of the device of the subject invention are that the arms are permitted to move in any direction and in any plane, without being engaged with fixed rotation centers; that the elastic characteristic of the joint is variable even for small transmitted movements; that the elastic elements are not subject to overheating; that the damping effect is satisfactorily constant under ambient temperature variations; that the joint reacts to the twisting movements of the arm with a remarkably low couple, so that bending of the sub-conductors is prevented in correspondence with the clamps when movements of the sub-conductors arise that twist the arms; and that the elastic elements work without sliding on any surface of the device so that there is no friction between said parts.

The novel features which are considered as characteristic of the invention are set forth, in particular, in the appended claims. The improved apparatus itself, however, both as to its construction and its mode of operation, together with additional features and advantages thereof, will be best understood upon a review of the following detailed description of certain specific embodiments with reference to the accompanying drawings.

DESCRIPTION OF THE PREFERRED EMBODIMENTS

Figure 1:
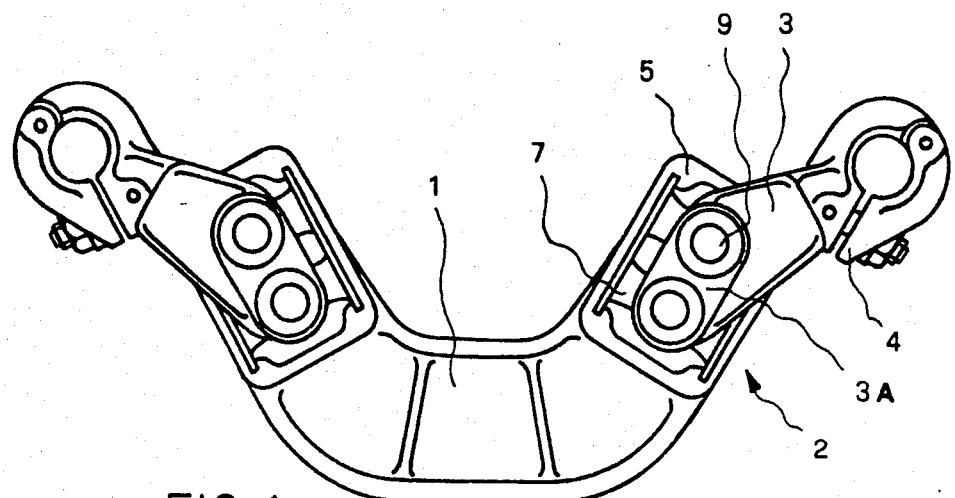
FIG. 1 is an assembly view of a spacer-damper device for use with a twin conductor which includes joints at opposite ends thereof.

In FIG. 1, a support 1 is provided which includes at each end thereof a joint 2 for an articulating arm 3. Arm 3 includes at its end opposite the joint 2 a clamp 4 which is adapted to clamp a sub-conductor (not shown).

Figure 2:
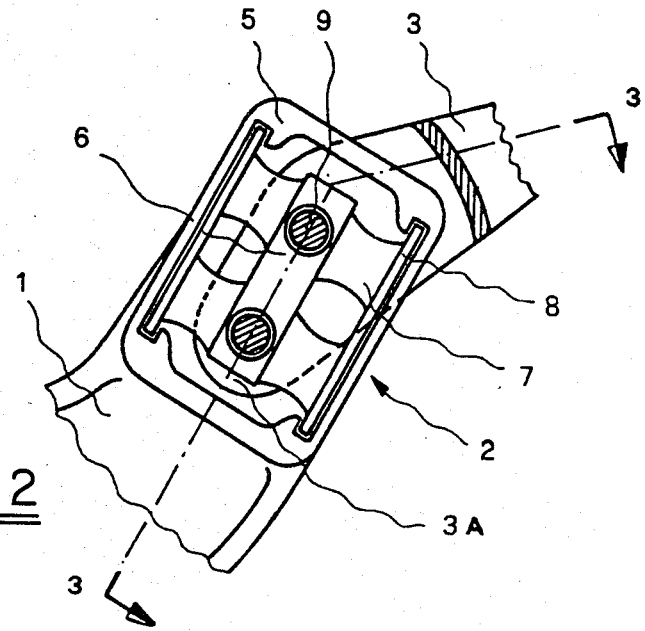
FIG. 2 is a somewhat enlarged cutaway front elevational view of one of the joints of the spacer-damper device shown in FIG. 1.
Figure 3:
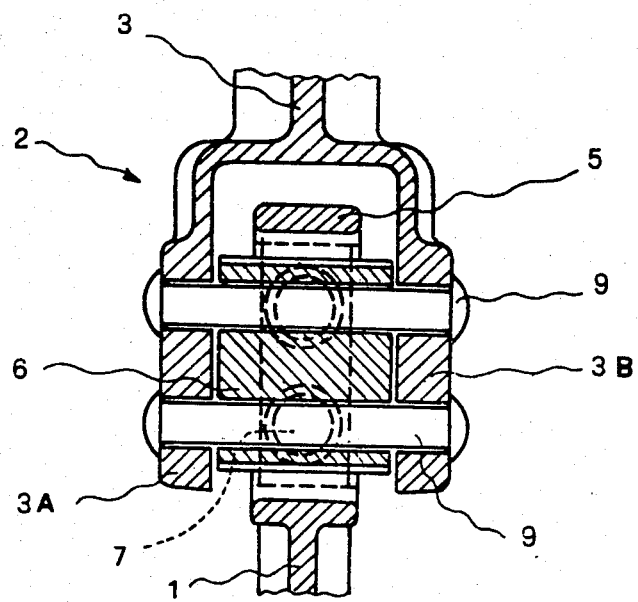
FIG. 3 is a cross-sectional view taken along line 3—3 of FIG. 2.

The joint 2 provided at either end of the support 1 is shown in greater detail in FIGS. 2 and 3 and includes a generally rectangularly shaped frame 5; a core 6 having rectangular cross-section positioned within the frame 5; and a plurality (preferably four) of elastic elements 7 in the form of concave cylinders made of an elastomeric material each of which is adhesively bonded at one end to the core 6 and adhesively bonded at the other end to a plate 8 which is friction fit in a slot 8A provided in the inner portion of frame 5. The end parts 3A and 3B of the arm 3 are rigidly fixed to the core 6 by means of two rivets 9, each passing through apertures in the core 6. The periphery of the core 6 is spaced from the inner perimeter of the frame 5 so as to permit the core 6 to freely twist in the plane of FIG. 1 as well as in a plane perpendicular thereto.

Support 1, frames 5, cores 6, plates 8 and arms 3 are all preferably fabricated from an aluminum alloy.

As shown in FIG. 3, the core 6 extends out of both sides of the frame 5 in order to permit the arm 3 as well as the core 6 to freely twist in the plane of the figure.

Figure 4:
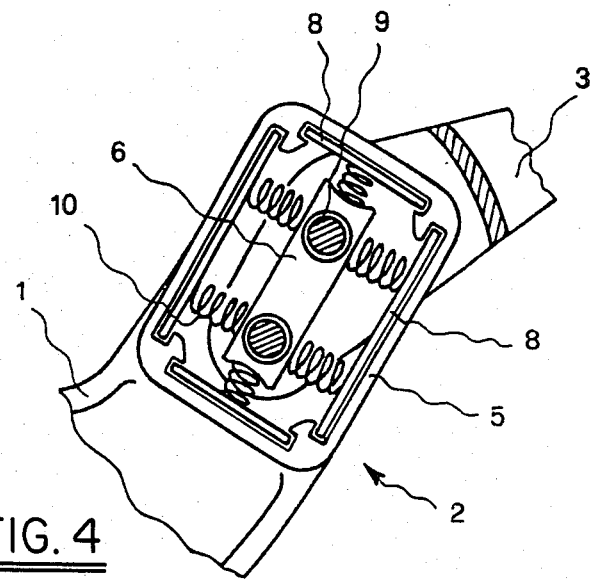
FIG. 4 is a front elevational view of a joint of the spacer-damper device as shown in FIG. 1 but illustrating an alternative embodiment of the elastic elements therein.

An alternative embodiment of the device of FIGS. 1–3 is shown in FIG. 4 wherein instead of elastomeric elastic elements, a plurality, preferably six, of elastic elements 10 made as steel spiral springs, are conveniently fixed to plates 8 friction fit in slots 8A provided in the inner part of the frame 5 and to the core 6, the elastic elements 10 being symmetrically spaced around the core 6.

Figure 5:
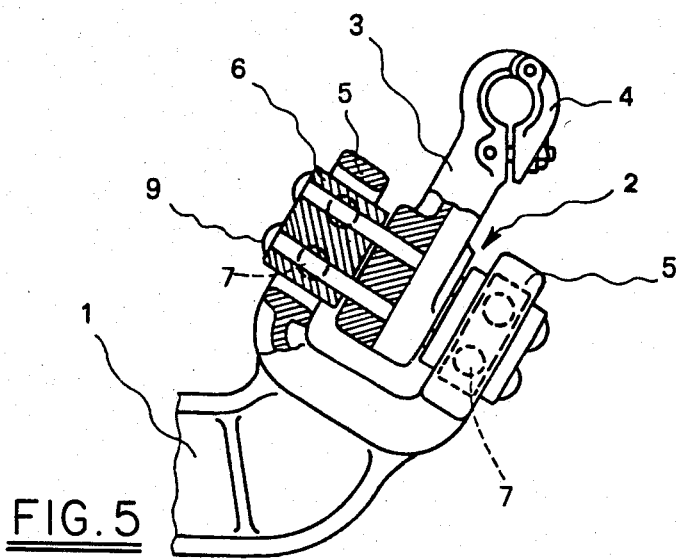
FIG. 5 is a partial sectional assembly view of a portion of the spacer-damper device as used in association with a twin conductor in accordance with the first alternative embodiment.

FIG. 5 illustrates a joint 2 provided between the support 1 and an arm 3, the joint 2 including two frames 5, each of which is located in a plane perpendicular to the plane of support 1. The arm 3 is fixed at its end to a core 6 provided within a frame 5 and elastically held therein by a plurality of elastic elements 7 in the manner hereinabove described. One of the frames 5 is depicted in section, while the other frame 5 is illustrated in elevational view.

Figure 6:
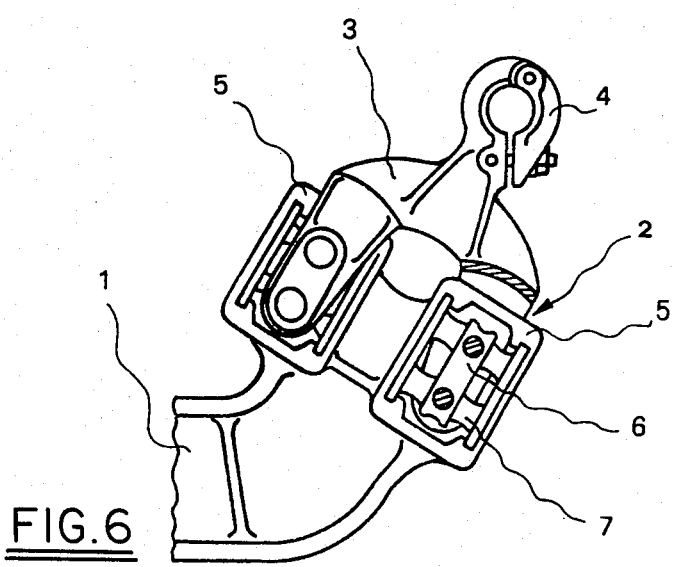
FIG. 6 is a partial sectional assembly view of a portion of the spacer-damper device as used in association with a twin conductor in accordance with a second alternative embodiment.

In FIG. 6, a joint 2 is positioned between the support 1 and an arm 3, the joint 2 comprising two frames 5, both of which are provided in a plane containing the support 1. The arm 3 forks at its end into two branches, each of which is resiliently secured to a core 6 held in a respective frame 5 by means of elastic elements 7 in the manner hereinabove described.

It will be appreciated that frames 5 of the joint 2 may be of virtually any shape, i.e., circular, oval, polygonal, in order to accommodate any particular useful function.

Similarly, support 1 may be of different shapes, each shape being suitable to the quantity of arms 3 that the support bears, depending on whether the conductor of the relevant electric line is a bundle made of two, three, four or more sub-conductors.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art, and therefore, such adaptations should be and are comprehended within the meaning and range of equivalence of the claims.

Wherefore, I claim:

1. A device for spacing apart and damping bundled subconductors of an electrical conductor, said device comprising a support; a plurality of arms; clamping means on each of said arms for clamping a subconductor; and a joint for each of said arms connecting the respective arm with said support, at least one of said joints including a frame on said support, a core disposed within said frame and connected with the respective arm, and at least two pairs of elastic elements between said core and said frame.

2. The device of claim 1, wherein the elastic elements of at least one pair are substantially symmetrically arranged about said core.

3. The device of claim 1, wherein at least one of said elastic elements has a first end which is secured to said core, and a second end which is secured to said frame.

4. The device of claim 1, wherein said support and said frame are located substantially in a common plane.

5. The device of claim 1, wherein said support and said frame are located in respective planes which intersect one another.

6. The device of claim 5, wherein said support and said frame are located in respective planes which are substantially perpendicular to one another.

7. The device of claim 1, wherein said support and said frame are located in respective planes which are substantially parallel to one another.

8. The device of claim 1, wherein said one joint includes a pair of frames on said support, a core disposed within each frame and connected with the respective arm, and at least two pairs of elastic elements between each core and each frame of said one joint.

9. The device of claim 8, wherein said support is located in a predetermined plane, and said frames are disposed in respective planes which are substantially perpendicular to said predetermined plane.

10. The device of claim 9, wherein said frames flank the respective arm.

11. The device of claim 8, wherein said support and said frames are located substantially in a common plane.

12. The device of claim 11, wherein the arm associated with said one joint has a pair of branches each of which is connected with a different core of said one joint.

13. The device of claim 8, wherein said support and said frames are located in substantially parallel planes.

14. The device of claim 13, wherein the arm associated with said one joint has a pair of branches each of which is connected with a different core of said one joint.

15. The device of claim 1, wherein the clamping means associated with said one joint defines a clamping passage for the respective subconductor, at least one of said elastic elements having an axis which is substantially perpendicular to the axis of said clamping passage.

16. The device of claim 1, wherein the arm associated with said one joint has a first end which carries the respective clamping means, and an opposite second end which is secured to said core.

17. The device of claim 1, wherein said core is arranged to move elastically within said frame in response to displacement of the associated subconductor in any direction.

18. The device of claim 1, wherein at least one of said elastic elements comprises an elastomeric material.

19. The device of claim 1, wherein at least one of said elastic elements comprises a steel spring.

20. The device of claim 1, wherein said frame is integral with said support.

21. The device of claim 1, wherein the arm associated with said one joint has a pair of branches which flank said core.

22. A device for spacing apart and damping bundled subconductors of an electrical conductor, said device comprising a support; a plurality of arms; clamping means on each of said arms for clamping a subconductor; and a joint for each of said arms connecting the respective arm with said support, at least one of said joints including a pair of frames on said support, a core disposed within each frame and connected with the respective arm, and elastic means between each core and each frame of said one joint.

23. The device of claim 22, wherein said frames flank the respective arm.

24. The device of claim 22, wherein the arm associated with said one joint has a pair of branches each of which is connected with a different core of said one joint.

25. The device of claim 24, wherein at least one of said branches has a pair of auxiliary branches which flank the respective core.

26. The device of claim 22, wherein said support is located in a predetermined plane, and said frames are disposed in respective planes which are substantially perpendicular to said predetermined plane.

27. The device of claim 26, wherein the clamping means associated with said one joint defines a clamping passage for the respective subconductor, said elastic means having an axis which is substantially perpendicular to the axis of said clamping passage.

28. The device of claim 22, wherein said support and said frames are located substantially in a common plane.

29. The device of claim 22, wherein said support and said frames are located in substantially parallel planes.

30. The device of claim 22, wherein the elastic means associated with at least one of said cores includes a pair of elastic elements which are substantially symmetrically arranged about said one core.

31. The device of claim 22, wherein at least one of said cores is arranged to move elastically within the respective frame in response to displacement of the associated subconductor in any direction.

32. A device for spacing apart and damping bundled subconductors of an electrical conductor, said device comprising a support; a plurality of arms; clamping means on each of said arms for clamping a subconductor; and a joint for each of said arms connecting the respective arm with said support, each of said joints including a respective core connected with the associated arm, a respective frame on said support substantially circumscribing the corresponding core, and elastic means between between the core and the frame.

33. The device of claim 32, wherein at least one of said elastic means comprises a pair of elastic elements which are substantially symmetrically arranged about the respective core.

* * * * *